US012069159B2

(12) United States Patent
Shpilrain et al.

(10) Patent No.: US 12,069,159 B2
(45) Date of Patent: Aug. 20, 2024

(54) REDACTABLE BLOCKCHAIN

(71) Applicant: Research Foundation of the City University of New York, New York, NY (US)

(72) Inventors: Vladimir Shpilrain, New York, NY (US); Dima Grigoriev, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 245 days.

(21) Appl. No.: 17/843,333

(22) Filed: Jun. 17, 2022

(65) Prior Publication Data

US 2022/0407681 A1 Dec. 22, 2022

Related U.S. Application Data

(60) Provisional application No. 63/212,907, filed on Jun. 21, 2021.

(51) Int. Cl.
*H04L 9/06* (2006.01)
*H04L 9/00* (2022.01)
*H04L 9/32* (2006.01)

(52) U.S. Cl.
CPC .......... *H04L 9/0643* (2013.01); *H04L 9/3239* (2013.01); *H04L 9/50* (2022.05)

(58) Field of Classification Search
CPC ....... H04L 9/0643; H04L 9/3239; H04L 9/50; H04L 63/12
See application file for complete search history.

(56) References Cited

U.S. PATENT DOCUMENTS

| | | | | |
|---|---|---|---|---|
| 11,303,707 | B1* | 4/2022 | Adler | A47L 9/00 |
| 2013/0287207 | A1* | 10/2013 | Zaverucha | H04L 9/3236 380/44 |
| 2013/0290712 | A1* | 10/2013 | Zaverucha | H04L 9/3252 713/168 |
| 2013/0290713 | A1* | 10/2013 | Zaverucha | H04L 9/3066 713/168 |
| 2014/0298038 | A1* | 10/2014 | Gauravaram | H04L 9/0643 713/189 |
| 2016/0057119 | A1* | 2/2016 | Kahrobaei | H04L 63/061 713/171 |
| 2017/0063526 | A1* | 3/2017 | Kahrobaei | H04L 9/008 |
| 2017/0338957 | A1* | 11/2017 | Ateniese | H04L 9/085 |

(Continued)

OTHER PUBLICATIONS

Huang, Ke, et al. "Scalable and redactable blockchain with update and anonymity." Information Sciences 546 (2021): 25-41.*

(Continued)

*Primary Examiner* — Jimmy H Tran
(74) *Attorney, Agent, or Firm* — Peter J. Mikesell; Schmeiser, Olsen & Watts, LLP

(57) ABSTRACT

A method for redacting a private blockchain comprises applying a hash function to a prefix and new content to compute a hash for a block of the blockchain; performing a modulo operation to convert the hash to an integer modulo; determining an inverse of the integer modulo; computing a redactable suffix from the prefix and the inverse of the integer modulo; replacing current content of the blockchain with the new content; and applying the redactable suffix to the block having the new content.

20 Claims, 6 Drawing Sheets

(56) References Cited

U.S. PATENT DOCUMENTS

| | | | | |
|---|---|---|---|---|
| 2019/0074962 | A1* | 3/2019 | Ateniese | H04L 9/0643 |
| 2020/0174990 | A1* | 6/2020 | Pratkanis | H04L 9/0637 |
| 2020/0374301 | A1* | 11/2020 | Manevich | G06F 16/2379 |
| 2021/0264520 | A1* | 8/2021 | Cummings | G06Q 40/12 |
| 2022/0029817 | A1* | 1/2022 | Wright | H04L 9/0836 |
| 2022/0069977 | A1* | 3/2022 | Manevich | H04L 9/50 |
| 2022/0318417 | A1* | 10/2022 | Beecham | G06F 16/9024 |
| 2022/0321354 | A1* | 10/2022 | Ladd | H04L 9/3247 |
| 2023/0059348 | A1* | 2/2023 | McBride | H04L 9/3297 |
| 2024/0039724 | A1* | 2/2024 | Kravitz | H04L 9/0643 |

OTHER PUBLICATIONS

Huang, Ke, et al. "Achieving intelligent trust-layer for Internet-of-Things via self-redactable blockchain." IEEE Transactions on Industrial Informatics 16.4 (2019): 2677-2686.*

Huang, Ke, et al. "Building redactable consortium blockchain for industrial Internet-of-Things." IEEE Transactions on Industrial Informatics 15.6 (2019): 3670-3679.*

Ren, Yanli, Xianji Cai, and Mingqi Hu. "Privacy-preserving redactable blockchain for Internet of Things." Security and Communication Networks 2021 (2021): 1-12.*

Deuber, Dominic, Bernardo Magri, and Sri Aravinda Krishnan Thyagarajan. "Redactable blockchain in the permissionless setting." 2019 IEEE Symposium on Security and Privacy (SP). IEEE, 2019.*

Assaqty, Mohammad Iqbal Saryuddin, et al. "Private-blockchain-based industrial IoT for material and product tracking in smart manufacturing." IEEE Network 34.5 (2020): 91-97.III.*

Grigoriev, D. et al.; RSA and redactable blockchains; International Journal of Computer Mathematics: Computer Systems Theory; Nov. 9, 2020; 7 pages; vol. 6, No. 1.

Ateniese, G. et al.; Redactable Blockchain-or-Rewriting History in Bitcoin and Friends; 2017 IEEE European Symposium on Security and Privacy; Date of Conference: Apr. 26-28, 2017; pp. 111-126; DOI: 10.1109/EuroSP.2017.37.

* cited by examiner

REDACTABLE BLOCKCHAIN

RELATED APPLICATIONS

This application claims priority to U.S. Provisional Application Ser. No. 63/212,907 filed on Jun. 21, 2021 entitled "REDACTABLE BLOCKCHAIN," the entirety of each of which is incorporated by reference herein.

FIELD OF THE INVENTION

The present disclosure relates generally to blockchain technology, and more particularly to a redactable blockchain structure.

BACKGROUND

Internet of Things (IoT) is a technology that connects physical objects or "things" or "smart devices" such as kitchen appliances, buildings, automobiles, thermostats, smart homes or buildings, and other items embedded with electronics, sensors, software, and other technologies over a network such as the Internet where the electronically connected objects can collect and exchange data. Studies indicate that over 30 billion IoT devices are connected and that this number is growing exponentially. However, IoT devices, for example, computer-controlled devices in vehicles such as brakes, engine, locks, etc., have been shown to be vulnerable to attackers who have access to the on-board network. In some cases, vehicle computer systems are Internet-connected, allowing them to be exploited remotely. Blockchain technology would provide at least a partial solution to these security problems.

Private networks for businesses, schools, and the like are commonly used to increase IoT devices. To address concerns about the security challenges of IoT deployments, private blockchain technology may be implemented. Unlike public blockchains for bitcoin cryptocurrencies or the like, a private blockchain permits a single entity such as an organization to have authority over the network so that only the participants are known and trusted for example, permitting only employees within an enterprise access to the network.

SUMMARY

In one aspect, the present inventive concept provides a method for redacting a private blockchain, comprising: applying a hash function to a prefix and new content to compute a hash for a block of the blockchain; performing a modulo operation to convert the hash to an integer modulo; determining an inverse of the integer modulo; computing a redactable suffix from the prefix and the inverse of the integer modulo; replacing current content of the blockchain with the new content; and applying the redactable suffix to the block having the new content.

In another aspect, a method of constructing a redactable blockchain according to a Rivest-Shamir-Adleman (RSA) cryptosystem comprises applying a public hash function to a prefix and new content to compute a hash for a block of the blockchain; performing a modulo operation to convert the hash to an integer modulo; determining an inverse of the integer modulo; computing a redactable suffix from the prefix and the inverse of the integer modulo; replacing current content of the blockchain with the new content; and applying the redactable suffix to the block having the new content.

In another aspect, a computer program product for redacting a private blockchain, the computer program product comprising: one or more computer readable storage media having computer readable program code collectively stored on the one or more computer readable storage media, the computer readable program code being executed by one or more processors of a computer system to cause the computer system to perform a method comprising: applying a hash function to a prefix and new content to compute a hash for a block of the blockchain performing a modulo operation to convert the hash to an integer modulo; determining an inverse of the integer modulo; computing a redactable suffix from the prefix and the inverse of the integer modulo; replacing current content of the blockchain with the new content; and applying the redactable suffix to the block having the new content.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

With the proliferation of IoT devices, private networks have emerged that create new challenges. In particular, it is desirable that while preserving the tampering detection property, to permit a system administrator or other central authority with security privileges to modify, delete, or add data to a blockchain of the network.

In brief overview, embodiments of the present inventive concept include redactable a blockchain structure for a private network and a method for constructing the same. In some embodiments, the system, method, and/or computer program product can construct a universal redactable blockchain involving a central authority or other private key holder. The content can be changed, for example, current content of a block can be replaced by new content by a well-known Rivest-Shamir-Adleman (RSA) cryptosystem. Unlike conventional redactable blockchain techniques, embodiments of the present inventive concept do not require a proprietary trapdoor hash function, or consensus based voting or permissionless setting based on a proprietary cryptographic construction, or the like, and can instead operate in conjunction with any certified hash function, for example, a secure cryptographic scheme accepted by the National Institute of Standards and Technology (NIST); therefore, trapdoor hash functions are not required for redacting a blockchain. As is well known, a hash function ensures the integrity of a link between the blocks of a blockchain. Accordingly, embodiments of the redactable blockchain techniques can be integrated with any type of blockchain and regardless of network.

Figure 1:
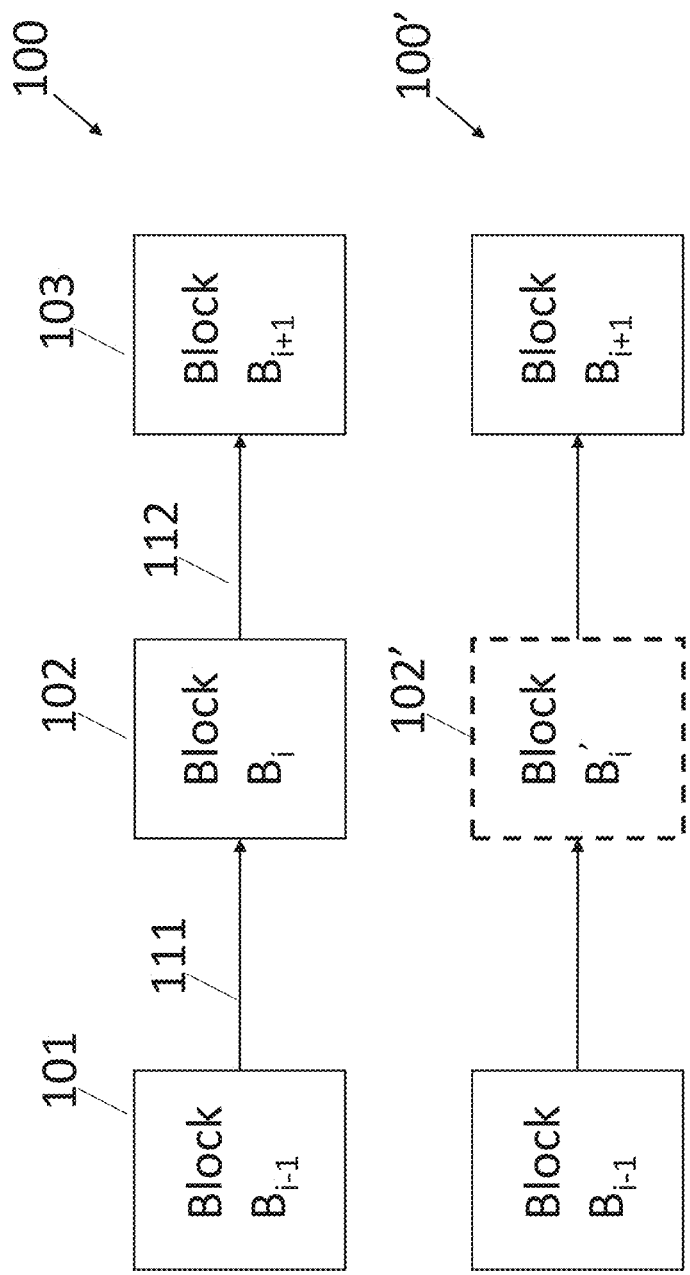
FIG. 1 illustrates a redaction operation on a redactable blockchain in which embodiments of the present inventive concepts can be practiced.

FIG. 1 illustrates a redaction operation on a redactable blockchain 100 in which embodiments of the present inventive concepts can be practiced.

The blockchain 100 maintains a list of blocks 101, 102, 103, or records. Additional blocks can be added to the blockchain. The blockchain 100 includes links 111, 112 between the blocks 101-103. For example, blockchain 102 may include a link 11 to the previous block 101 and/or a link 112 to the next block 103. Conventional blockchains are inherently resistant to modification of the data, or immutable, so that the data in one block cannot be modified without modifying the contents of the other blocks. Here, a system administrator or other central authority is incapable of modifying a block without consensus from the other nodes in the blockchain. Consensus-based techniques generally require a policy that dictates the requirements and constrains for performing a blockchain redaction operation. However, consensus-based voting or the like is not required, thereby permitting embodiments of a blockchain redaction operation to be performed on any type of blockchain managed by a central authority, including blockchains based on various cryptographic constructions.

The blockchain 100 illustrated in FIG. 1 is a redactable blockchain for private networks to accommodate the above-mentioned growth in IoT implementations. The links 111 and 112 between the blocks 101-103 can form an immutable chain of blocks, or blockchain. A hash function is used to connect each block 101-103 to the previous block to form the chain. The hash function may establish, or form, the links 111, 112 between adjacent blocks 101-103. Embodiments of the present inventive concept can be employed to change the content of a block, for example, from block 102 to block 102'. The block content may include secured data such as smart contract content, transaction information, and so on, but not limited thereto. Block 102' may include new data or modifications to the original data of block 102 rewritten data such as a redactions or additions to the original data. Other embodiments of the present inventive concept can be employed to add or delete blocks. A central authority can electronically provide the new blockchain 100' which is redactable to users of interest.

Figure 2:
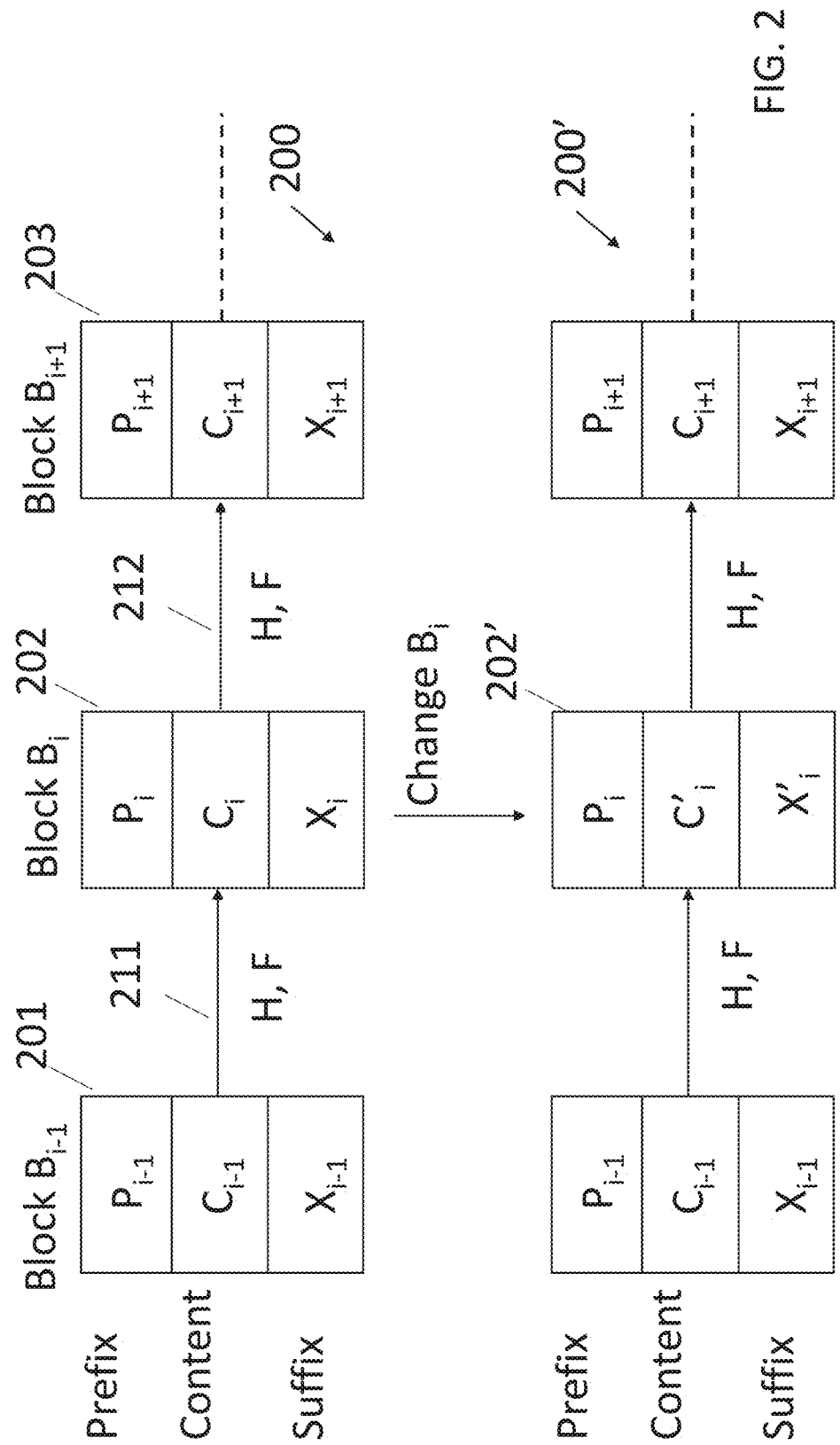
FIG. 2 is a view of a blockchain, in accordance with some embodiments.

FIG. 2 is a view of a blockchain 200, in accordance with some embodiments. For purposes of brevity, reference is made to a block ($B_i$) 202. The other blocks ($B_{i-1}$, $B_{i+1}$) in the blockchain 200 may have a similar or same construction.

In some embodiments, block ($B_i$) 202 includes a permanent prefix ($P_i$), a source of content ($C_i$), and a redactable suffix ($X_i$). In some embodiments, the blockchain 200 includes a hash $h_i=H(P_i, C_i)$, where H is any public hash function, and a public one-way function F such that $F(h_i, X_i)=P_{i+1}$. The hash function H and the one-way function F may be public to permit a user, e.g., via a hardware computer, to create or modify a blockchain as well as verify the integrity of the blockchain, for example, according to an equation described with respect to method step 312 below, where the suffix $X_i$ is replaced by $X'_i$ and integer $d_i$ is replaced by $d'_i$. In some embodiments, the hash function is collision-free, i.e., two different sequences not generating the same hash value. In order for the blockchain 200 to be redactable and in order to verify the integrity, a central authority may be required to have a private key that would allow for replacing the blockchain content $C_i$ with an arbitrary $C'_i$. When a new suffix $X'_i$ is selected, the equality $F(h'_i, X'_i)=P_{i+1}$ may apply.

Unlike the content and the suffix, the prefix of a block of interest cannot be changed to ensure the blockchain's integrity, since the prefix of a block $B_{i+1}$ depends on the previous block $B_i$ or the prefix of the block $B_{i-1}$ depends on the next block $B_i$ of the blockchain. Some embodiments include the prefix being a one-way function of the fingerprint $H(B_i-1)$ of the previous block $B_i-1$. The one-way function renders it infeasible to select an input value corresponding to a known output value. Embodiments can operate in blockchain configurations where the prefix of $B_i-1$ depends on $B_i$. Here, an integrity check may have the form $F(h_i, X_i)=P_i-1$.

Figure 3:
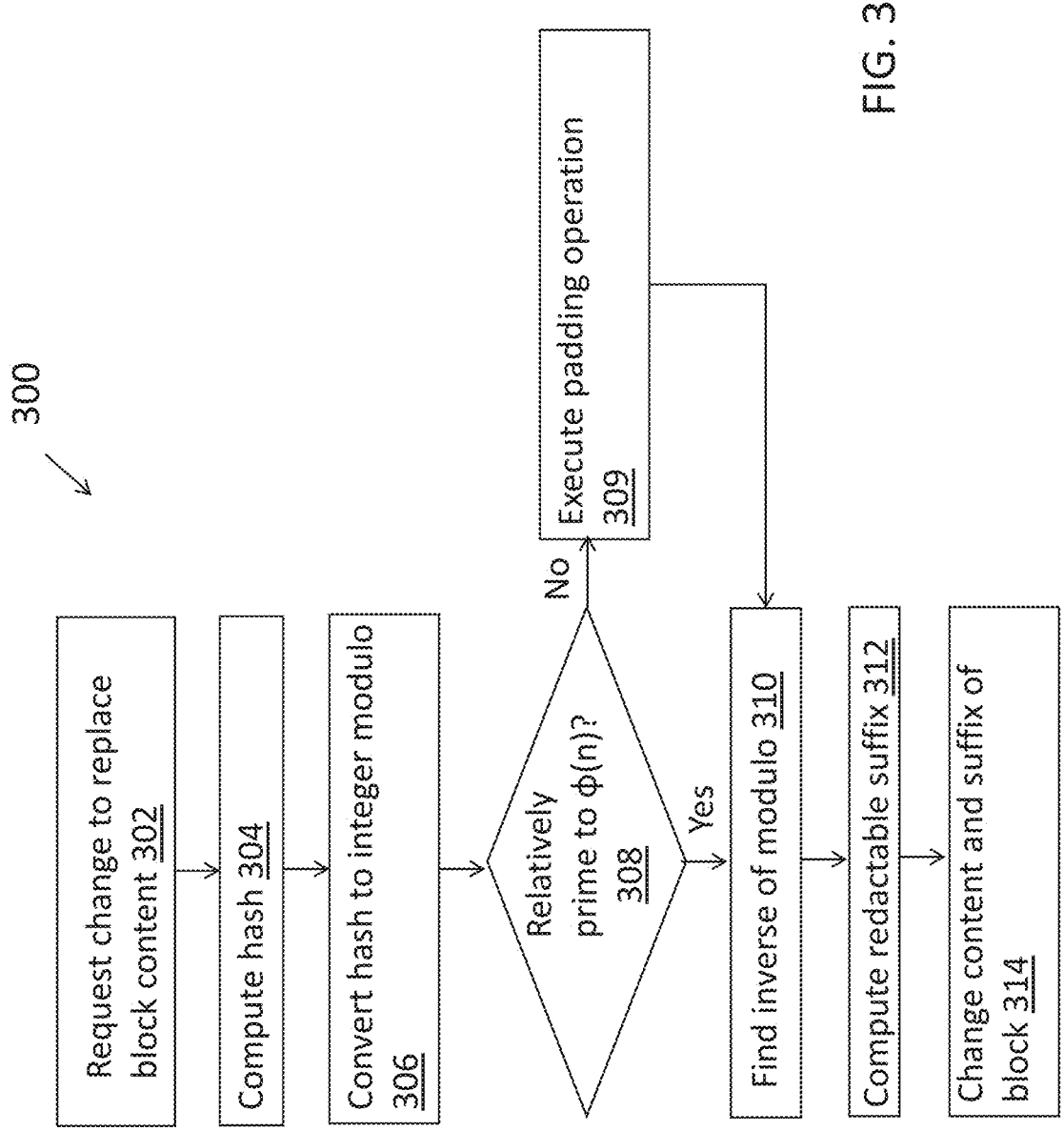
FIG. 3 is a method for editing a blockchain, in accordance with some embodiments.

FIG. 3 is a method 300 for editing a blockchain, in accordance with some embodiments. Some or all of the method 300 can be performed by the special-purpose computer, for example, a processor storing and executing the blockchain 200 of FIG. 2, or other blockchain comprising a group of blockchain nodes, smart contract, management software, and so on. Accordingly, the method 300 may improve the operation of the computer system, for example, including an IoT device, storing and executing the method steps by protecting the data from security-related cyberattacks, unauthorized access to the computer system, and so on.

A central authority in possession of a private key may wish to change the content of a block $B_i$ from $C_i$ to $C'_i$. In order to allow for the requested redaction of block 302, for example, changing from content $C_i$ to $C'_i$ (302), the blockchain 200 is transitioned to the redactable blockchain 200' by computing a hash $h_i'=H(P_i, C_i')$, where H is a public hash function, $P_i$ is a permanent prefix, and $C_i'$ is the new content or content changed from content $C_i$. The hash $h_i'$ is generated due to a change in content of the block $B_i$. The hash function H is provided to 'seal' each block and can be used for a hashing operation to produce a transaction. The blocks can be connected in a chain by using another hash function and/or one-way function. The hash function H can comply with the secure hashing algorithm (SHA)-256 or other cryptographic hash function, e.g., a standard specifying secure one-way hash functions hash algorithms, SHA-1, SHA-224, SHA-256, SHA-384, SHA512, and so on. For example, a public hash function H (e.g., SHA-256) can be applied to a concatenation of $P_i$ and $C_i'$ to produce $h_i'=H(P_i, C_i')$. The generated hash $h_i'$ may be stored in a ledger or the like associated with the blockchain.

At block 306, the hash $h_i'$ can be converted to an integer, and more specifically an integer $d'_i$ modulo n. At decision diamond 308, a determination is made whether the integer $d'_i$ is relatively prime to the Euler totient function $\phi(n)=(p-1)(q-1)$, e.g., there are no factors in common with $\phi(n)$. Here, Euler's Theorem may apply where two primes (p, q) are determined and n=pq, and φ(n)=(p−1)(q−1), and applied to the RSA algorithm to compute a private key d. In other embodiments, functions other than a Euler totient function may apply. This requires a party who would like to change the content of a single block to essentially solve the RSA problem, namely, to recover X from in, $X^d$ (mod n), and d, where d is relatively prime to φ(n). This is considered computationally infeasible for an appropriate choice of n and a random d, 0<d<n. Public immutability of the blockchain 200 is based on the computational hardness of the RSA problem rather than properties of the underlying hash function.

If at decision diamond 308 a determination is made that the integer $d'_i$ is relatively prime to φ(n), then the method 300 proceeds to block 310 where the inverse $e'_i$ of $d'_i$ modulo φ(n) is computed.

If at decision diamond 308 a determination is made by the system that the integer $d_i'$ is not relatively prime to φ(n), then the method proceeds to block 309, where a padding operation is performed so that integer $d'_i$ is relatively prime to φ(n). An exemplary padding operation is described with respect to FIG. 4, but is not limited thereto.

At block 312, the redactable suffix $X'_i$ is computed, for example, according to the equation: $X'_i = P^{e'_i}_{i+1}$ (mod n). The integrity of the data transactions based on the block chain 200, 200' may be maintained notwithstanding a change of a block $B_i$ according to the integrity check equation: $(X_i)^{d'_i} = (P_{i+1}^{e'_i})^{d'_i} = P_{i+1}$ (mod n) because:

$$e'_i d'_i = 1 (\text{mod } \phi(n)) \text{ and } (P_{i+1})^{\phi(n)} = 1 (\text{mod } n)$$

At block 314, the central authority having the generated private key has the authority to change the block 202, for example, redacting block 202, e.g., changing the content of the block from content $C_i$ to content $C_i'$ and changing the suffix $X_i$ to $X'_i$, or otherwise providing a new block 202' including the same. The integrity of the blockchain is also preserved because the modified block $B'_i$ has the same prefix $P_i$ as the original block $B_i$. The prefix $P_{i+1}$ of the next block also does not change.

Figure 4:
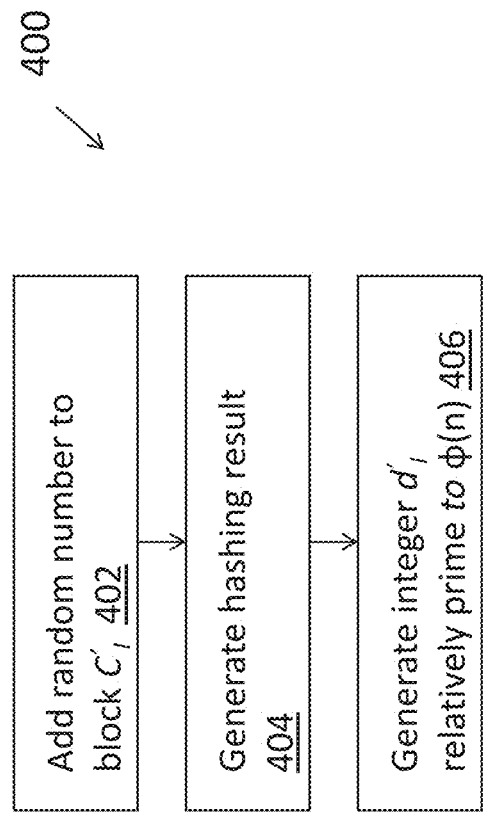
FIG. 4 is a method for performing a padding operation to a hash computation, in accordance with some embodiments.

FIG. 4 is a method 400 for performing a padding operation to a hash computation, in accordance with some embodiments. The padding operation can be performed in a preprocessing state, e.g., prior to a hash computation. In some embodiments, the method 400 may be applied to block 309 of method 300 of FIG. 3. For example, a central authority in possession of a private key to the blockchain 200 may wish to change the content $C_i$ of a block $B_i$ or otherwise delete, modify, or insert a block, and in doing so computes the hash $h_i = H(P_i, C_i)$ and converts it to an integer $d_i$ modulo n. The number $d_i$, which may be generated for a private key, should be relatively prime to φ(n), or the Euler function of n for encryption purposes. If it is not, then the central authority can rely on the padding operation described in the method 400 so that $d_i$ is relatively prime to φ(n). This permits the blockchain 200 to comply with an RSA encryption scheme so that an RSA-based implementation of the blockchain structure can be achieved.

For example, a randomized encryption function may include two large primes p and q, which can be generated by searching among a known arithmetic sequence. Primes are used for generating unique values for a hash function by multiplying the primes. As is well-known, prime numbers can reduce the probability of hash collisions. A public key can be generated from two large prime numbers. In accordance with Euler's theorem, n=pq, where p and q are safe prime integers, in the form of 2r+1 where r is another prime integer. If $d_i$ is not relatively prime to φ(n), this means that either (1) $d_i$ is even, or (2) $d_i$ is odd but is divisible by a large prime (recall that p and q are safe primes, i.e. (p−1)/2 and (q−1)/2 are primes.

Thus, at block 402, the blockchain processor adds a random number, for example, 0 bits, to the block $C_i$. Since the hash function H is assumed to pass all standard statistical tests, with probability (e.g., ½), the result of the hashing operation will be a bit string that converts to an odd integer $d_i$, and with very high probability this $d_i$ is also going not to be divisible by $(p−1)^2$ and (q−1)/2. Thus, at block 406, an integer $d_i$ relatively prime to φ(n) is generated. In some embodiments, steps 402 and/or 404 may be repeated to determine the integer $d_i$ relatively prime to φ(n).

As described above, a well-known RSA encryption scheme can be applied to embodiments of the blockchain structure. Public information may include a large integer n determined by a product of two large primes and a hash function, e.g. SHA-256. Also required is private information such as the two prime factors p and q.

As also described above, each block $B_i$ includes a prefix $P_i$, the actual content $C_i$ (e.g. a transaction description), and a suffix $X_i$, which is a nonzero integer modulo n. The suffix $X_i$ preferably does not have an order 2, i.e. $X_i^2 \neq 1$ (mod n) to ensure that $X_i$ does not have a small order since p and q are safe primes. Therefore, if the order of an element of the multiplicative group $\mathbb{z}$ is not 2, then it is large. Thus, an entity that forms a block $B_i$ may select the suffix $X_i$ at random on integers between 1 and n−1 and then checks if $X_i^2 \neq 1$ (mod n). If $X_i^2 = 1$ (mod n), random selection of $X_i$ is repeated. Once a proper $X_i$ is selected, a public hash function H (e. g. SHA-256) is applied to concatenation of $P_i$ and $C_i$ to produce $h_i = H(P_i, C_i)$, and $h_i$ is then converted to an integer=$d_i$ (mod n). $d_i$ modulo n. The prefix $P_{i+1}$ of the next block can be computed as $P_{i+1}(X_i)^{d_i}$ (mod n).

Accordingly, a malicious actor desiring to change the content $C_i$ of the block $B_i$ is required to solve the RSA problem to which no feasible method for solving is known. In particular, the actor must recover the suffix X from n, $X^d$ (mod n), and d relatively prime to φ(n). This is computationally infeasible for an appropriate choice of n and a random d, 0<d<n.

Embodiments of the present inventive concept can also address the risk of unauthorized modifications of a block in a blockchain, including attempts to corrupt or change the content of a block. An intruder may attempt to corrupt a blockchain block by initiating a random suffix $X_i$ and searching for a number $d_i$ such that $(X_i)^{d_i} = P_{i+1}$ (mod n), for a given $P_{i+1}$. However, the method 300 of FIG. 3 requires an intruder to solve the discrete logarithm problem, which is computationally infeasible if n is sufficiently large.

The hash function H includes particular properties including preimage resistance and corruption resistance. In the absence of a preimage-resistant hash function H according to some embodiments, a two-step corruption attack would be possible. In some embodiments, a preimage-resistance of the hash function is provided by replacing a first integrity condition including a prefix of a next block of the blockchain with a second integrity condition. In some embodiments, an integrity condition may comply with the equation: $P_{i+1} = (X_i)^{d_i}$ (mod n). A cyberattacker may determine that block $B_i$ was changed so that $(X_i)^{d_i} = (X'_i)^{d'_i}$ (mod n). Here, the attacker may be in possession of $X_i$, $X'_i$, $d_i$, and $d'_i$. The following omits the index i for brevity.

In this example, the attacker can corrupt the block $B_i$, for example, change it to something meaningless. Generically, g.c.d.(d,d')=1, so it may be assumed that there are a, b∈$Z_n$ such that da+d'b=1. Then $X = ((X')^a X^b)^{d'}$. Now if $X'' = (X')^a X^b$ and d"=d'd, then $(X'')^{d''}=((X')^a X^b)^{d'd}=(((X')^a X^b)^{d'})^d=X^d$. Thus, if the attacker can find another suffix, X", and d" such that $(X'')^{d''}=X^d$, the attacker can therefore corrupt the block $B_i$.

However, the problem for the attacker when embodiments of the present inventive concept are deployed is that d" should be the hash of something, i.e. the attacker will face an additional problem of finding a preimage of d" under the hash function H. If the preimage resistance of the hash function H is a concern, then the integrity condition is $P_{i+1}=(X_i)^d_i$ (mod n) can be replaced by $P_{i+1}=(X_i)^{d(sq)2_i+1}$ (mod n), for example, squaring and adding an integer, e.g., 1, to the result d for an extra layer of security. Corruption resistance is based on the computational hardness of the discrete logarithm problem.

Figure 5:
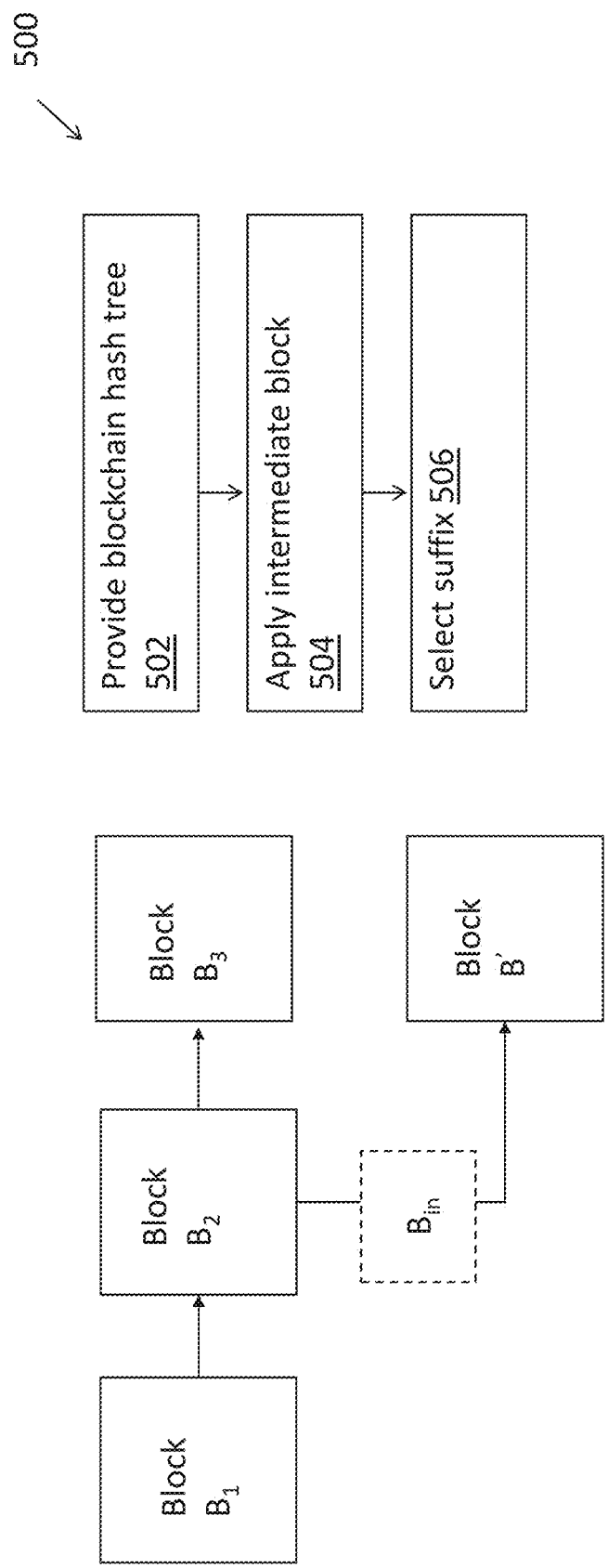
FIG. 5 is a method for editing a blockchain, in accordance with other embodiments.

FIG. 5 is a method 500 for editing a blockchain, in accordance with other embodiments. In some embodiments, method 500 can be applied to binary hash trees or related data structures comprising hashes of various data blocks that summarize all the transactions in a block. Public data structures such as cryptocurrencies may include immutable chains formed by authenticated data structures built on trees. In these embodiments, the method 500 can be applied with respect to redactable blockchains. Method 500 can generate a redactable data structure if the underlying graph, i.e., tree, has a node of degree greater than 2.

At block 502, a blockchain hash tree is provided. For example, three blocks $B_1$, $B_2$, $B_3$ are connected in a chain. Block B2 is also connected to a second block B'. Therefore, the underlying graph the node corresponding to the second block B' has a node of degree greater than 2, i.e., degree 3.

A central authority may modify content of the block $B_2$. As described above with respect to the method 300, a suffix $X_i$ preferably does not have an order 2, i.e. $X_i^2 \neq 1$ (mod n). Here, due to the degree 3 configuration the central authority would be required to find a suffix $X_2$ for the block $B_2$ such that $(X'_2)^{d_2}=P_3$ (mod n) and at the same time $(X'_2)^{d_2}=P'$ (mod n), where P is the prefix of the block B. However, the foregoing may not be feasible if $P_3=P'$. To address this, at block 504, an 'intermediate' block $B_{in}$ is positioned between $B_2$ and B. Here, the prefix of $B_{in}$ will be the same as that of $B_3$, i.e., equal to $(X_2)^{d_2}$ (mod n). The content of $B_{in}$ can just indicate that this block is intermediate, i.e., it does not have any other function. At block 506, the suffix $X_{in}$ can be selected following the method 300 of FIG. 3, e.g., so that $X_{in}^{d_{in}}=P_3$ (mod n).

Figure 6:
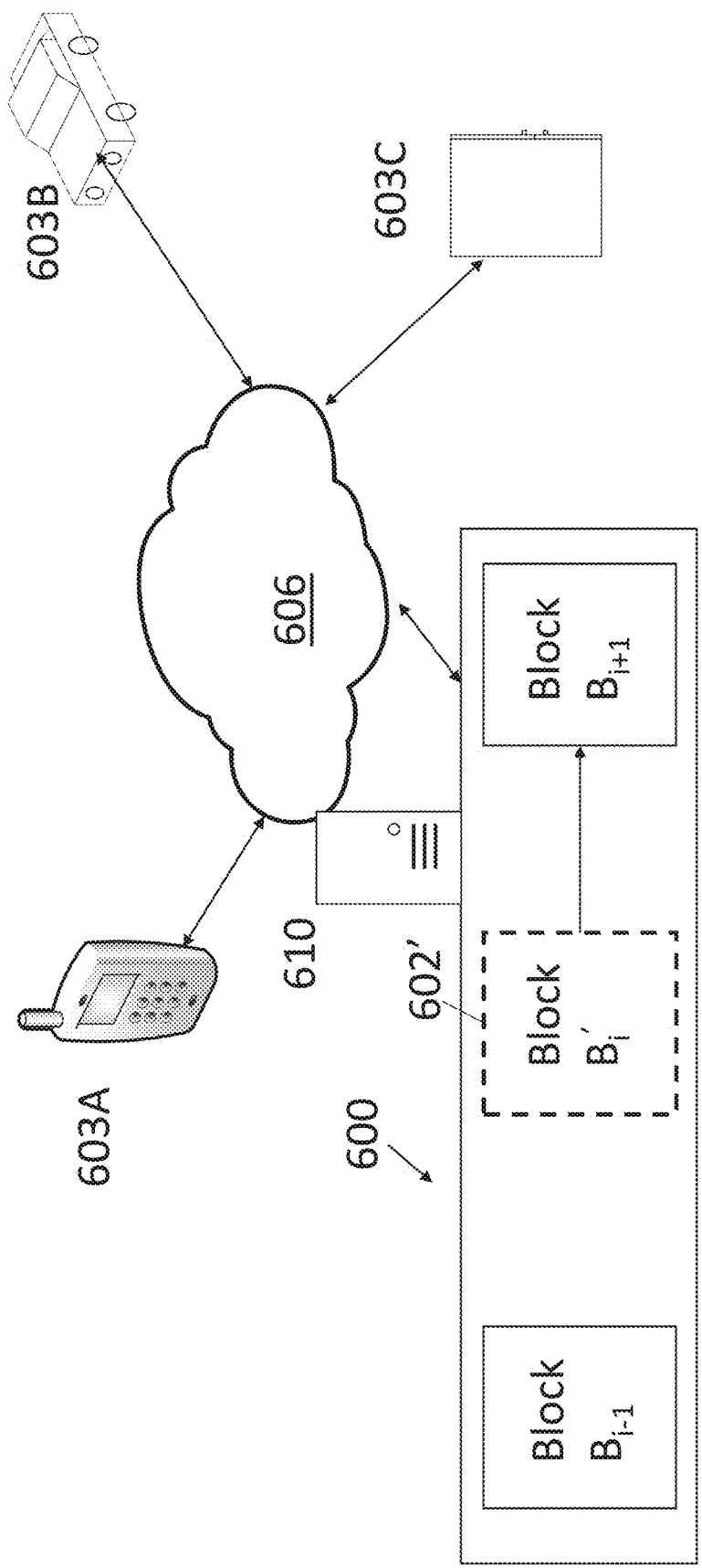
FIG. 6 illustrates an IoT redactable blockchain application, in accordance with embodiments of the present inventive concepts.

FIG. 6 illustrates an IoT redactable blockchain application, in accordance with embodiments of the present inventive concepts. As shown, redactable blockchains 600 may be used in securely storing and transmitting data via a network 606 such as the internet from IoT devices 602, for example, used in automobiles, mobile devices, and smart home appliances, but not limited thereto. An IoT device such as a smartphone camera 603A, automobile engine 603B or refrigerator sensor 603C may record text, video, images, and/or other data and store the data at the redactable blockchain 600. The blockchain 600 may be constructed at a computer 610 so that only a user of the IoT device is a central authority, or an agent authorized by the user may alter the blockchain 600, for example, to change a block 602'. Thus, the authenticity of the data can be verified by the user possessing a key or other authorization element necessary to access and modify the blockchain 600. Since the blockchain 600 is rewritable, the user may modify the data. In some embodiments, the method 500 of FIG. 5 may be employed in configurations where the blockchain includes forks, branches, or the like for accommodating two different blocks.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transient computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for redacting a private blockchain, comprising:
    applying a hash function to a prefix and new content to compute a hash for a block of the blockchain;
    performing a modulo operation to convert the hash to an integer modulo;
    determining an inverse of the integer modulo;
    computing a redactable suffix from the prefix and the inverse of the integer modulo;
    replacing current content of the blockchain with the new content; and
    applying the redactable suffix to the block having the new content.

2. The method of claim 1, wherein the integer is relatively prime to a Euler totient function.

3. The method of claim 2, further comprising performing a padding operation so that the integer is relatively prime to the Euler totient function.

4. The method of claim 1, wherein the hash function is a public hash function.

5. The method of claim 1, wherein the hash function complies with a secure cryptographic scheme certified by the National Institute of Standards and Technology (NIST).

6. The method of claim 1, wherein the block includes a one-way public function (F).

7. The method of claim 1, wherein a prefix of a previous block or a next block depends on the block.

8. The method of claim 1, wherein the new content is replaced by the current content by a central authority using a private key.

9. The method of claim 1, wherein an RSA private key is generated from the integer modulo.

10. The method of claim 8, wherein the block is linked to a first next block and a second next block, and wherein the method further comprises:
    providing an intermediate block between the block and second next block, the second next block having a prefix that is the same as a prefix of the first next block; and
    modifying by the central authority the content of the block.

11. A method of constructing a redactable blockchain according to a Rivest-Shamir-Adleman (RSA) cryptosystem, comprising:
    applying a public hash function to a prefix and new content to compute a hash for a block of the blockchain;
    performing a modulo operation to convert the hash to an integer modulo;
    determining an inverse of the integer modulo;
    computing a redactable suffix from the prefix and the inverse of the integer modulo;
    replacing current content of the blockchain with the new content; and
    applying the redactable suffix to the block having the new content.

12. The method of claim 11, further comprising performing a padding operation so that the integer is relatively prime to a Euler totient function.

13. The method of claim 11, wherein the new content is replaced by the current content by a central authority using a private key.

14. The method of claim 13, wherein the block is linked to a first next block and a second next block, and wherein the method further comprises:
    providing an intermediate block between the block and second next block, the second next block having a prefix that is the same as a prefix of the first next block; and
    modifying by the central authority the content of the block.

15. The method of claim 11, wherein a preimage-resistance of the hash function is provided by replacing a first integrity condition including a prefix of a next block of the blockchain with a second integrity condition.

16. The method of claim 11, wherein an RSA private key is generated from the integer modulo.

17. A computer program product for redacting a private blockchain, the computer program product comprising:
    one or more computer readable storage media having computer readable program code collectively stored on the one or more computer readable storage media, the computer readable program code being executed by one or more processors of a computer system to cause the computer system to perform a method comprising:
    applying a hash function to a prefix and new content to compute a hash for a block of the blockchain;
    performing a modulo operation to convert the hash to an integer modulo;
    determining an inverse of the integer modulo;
    computing a redactable suffix from the prefix and the inverse of the integer modulo;
    replacing current content of the blockchain with the new content; and
    applying the redactable suffix to the block having the new content.

18. The method of claim 17, further comprising performing a padding operation so that the integer is relatively prime to a Euler totient function.

19. The method of claim 17, wherein the hash function is a public hash function.

20. The method of claim 17, wherein the block is linked to a first next block and a second next block, and wherein the method further comprises:
    providing an intermediate block between the block and second next block, the second next block having a prefix that is the same as a prefix of the first next block; and
    modifying by a central authority the content of the block.

\* \* \* \* \*